US009243418B2

(12) United States Patent
Bögl et al.

(10) Patent No.: US 9,243,418 B2
(45) Date of Patent: Jan. 26, 2016

(54) TOWER COMPRISING AN ADAPTER PIECE AND METHOD FOR PRODUCING A TOWER COMPRISING AN ADAPTER PIECE

(75) Inventors: Stefan Bögl, Sengenthal (DE); Martin Hierl, Neumarkt (DE); Josef Knitl, Freystadt (DE)

(73) Assignee: MAX BOGL BAUUNTERNEHMUNG GMBH & CO. KG, Sengenthal (DE)

( * ) Notice: Subject to any disclaimer, the term of this patent is extended or adjusted under 35 U.S.C. 154(b) by 0 days.

(21) Appl. No.: 13/704,263

(22) PCT Filed: May 4, 2011

(86) PCT No.: PCT/EP2011/057088
§ 371 (c)(1),
(2), (4) Date: Dec. 14, 2012

(87) PCT Pub. No.: WO2011/157476
PCT Pub. Date: Dec. 22, 2011

(65) Prior Publication Data
US 2013/0081350 A1    Apr. 4, 2013

(30) Foreign Application Priority Data

Jun. 14, 2010  (DE) .......................... 10 2010 030 047
Aug. 26, 2010  (DE) .......................... 10 2010 039 796

(51) Int. Cl.
*E04H 12/00* (2006.01)
*E04H 12/08* (2006.01)
(Continued)

(52) U.S. Cl.
CPC .............. *E04H 12/085* (2013.01); *E04H 12/08* (2013.01); *E04H 12/12* (2013.01); *E04H 12/16* (2013.01);
(Continued)

(58) Field of Classification Search
CPC . E05B 2240/912; Y02E 10/728; F03D 11/04; F03D 11/045; E04H 12/085; E04H 12/08; E04H 12/12
See application file for complete search history.

(56) References Cited

U.S. PATENT DOCUMENTS

| 4,042,659 A | 8/1977 | Botting et al. |
| 4,374,790 A | 2/1983 | McGowan |

(Continued)

FOREIGN PATENT DOCUMENTS

| DE | 2 326 192 A | 12/1974 |
| DE | 199 28 785 A1 | 1/2001 |

(Continued)

OTHER PUBLICATIONS

U.S. Appl. No. 13/704,265.
(Continued)

*Primary Examiner* — Andrew J Triggs
(74) *Attorney, Agent, or Firm* — J. Bennett Mullinax, LLC

(57) ABSTRACT

The invention relates to a tower (1) comprising a lower tubular tower section (2) made of concrete, an upper tubular tower section (3) made of steel and an adapter piece (7) for connecting the two tower sections (2, 3). The adapter piece (7) consists of an annular concrete element (8) and a steel element (9), the steel element (9) containing at least one annular flange (9a) that covers preferably entirely a surface of the concrete element (8), said surface being at the top in the installed state. The steel element (9) is directly cast together with the concrete element (8), wherein the annular flange (9a) is completely underpoured, essentially without air inclusions. In a method for producing a tower (1) comprising an adapter piece (7), a steel element (9) having an annular flange (9a) is placed head down into an annular formwork in order to produce said adapter piece (7). A concrete material is then introduced into the formwork in order to produce an annular concrete element (8) of the adapter piece (7), whereby the concrete material is directly applied onto the subsequent bottom side of the flange (9a).

9 Claims, 4 Drawing Sheets

(51) Int. Cl.
*F03D 11/04* (2006.01)
*E04H 12/16* (2006.01)
*F03D 1/00* (2006.01)
*E04H 12/12* (2006.01)

(52) U.S. Cl.
CPC .............. *F03D 1/001* (2013.01); *F03D 11/04* (2013.01); *F03D 11/045* (2013.01); *F05B 2230/60* (2013.01); *F05B 2240/912* (2013.01); *F05B 2250/141* (2013.01); *Y02E 10/728* (2013.01)

(56) References Cited

U.S. PATENT DOCUMENTS

| | | | |
|---|---|---|---|
| 4,878,160 A * | 10/1989 | Reneau et al. | 362/269 |
| 4,890,420 A | 1/1990 | Azimi | |
| 5,643,488 A | 7/1997 | Lee | |
| 5,645,773 A | 7/1997 | Ichikawa | |
| 5,728,334 A | 3/1998 | Lee | |
| 5,826,387 A * | 10/1998 | Henderson et al. | 52/295 |
| 5,830,394 A | 11/1998 | Dolgopolov | |
| 5,878,540 A * | 3/1999 | Morstein | 52/296 |
| 6,277,316 B2 | 8/2001 | Kistner et al. | |
| 6,340,790 B1 * | 1/2002 | Gordin et al. | 174/45 R |
| 6,808,384 B1 * | 10/2004 | Jordan et al. | 425/432 |
| RE40,228 E * | 4/2008 | Savoca | 362/431 |
| 7,877,944 B2 * | 2/2011 | Seidel | 52/296 |
| 8,030,377 B2 | 10/2011 | Dubey et al. | |
| 8,272,173 B2 * | 9/2012 | Jakubowski | 52/40 |
| 8,402,718 B2 * | 3/2013 | Stiesdal | 52/845 |
| 8,418,413 B2 * | 4/2013 | Marmo et al. | 52/167.4 |
| 8,465,687 B2 | 6/2013 | Hager | |
| 8,555,600 B2 | 10/2013 | Cortina-Cordero et al. | |
| 8,597,564 B2 | 12/2013 | Hölscher | |
| 8,681,923 B2 | 3/2014 | Ashida et al. | |
| 2003/0000165 A1 | 1/2003 | Tadros et al. | |
| 2004/0074171 A1 | 4/2004 | Wobben | |
| 2005/0110197 A1 | 5/2005 | Deffense | |
| 2005/0120670 A1 | 6/2005 | Ness et al. | |
| 2005/0121830 A1 | 6/2005 | Ness et al. | |
| 2005/0129504 A1 | 6/2005 | DeRoest | |
| 2006/0179779 A1 | 8/2006 | Ness | |
| 2006/0254168 A1 | 11/2006 | Wobben | |
| 2006/0254196 A1 | 11/2006 | Wobben | |
| 2009/0000227 A1 | 1/2009 | Jakubowski et al. | |
| 2009/0031639 A1 | 2/2009 | Cortina/Cordero | |
| 2010/0257811 A1 * | 10/2010 | Jakubowski | 52/700 |
| 2010/0325986 A1 * | 12/2010 | Maestre et al. | 52/223.3 |
| 2011/0107708 A1 | 5/2011 | Holscher | |
| 2011/0131899 A1 * | 6/2011 | Voss et al. | 52/173.1 |
| 2011/0158750 A1 | 6/2011 | Reichel et al. | |
| 2012/0243943 A1 | 9/2012 | Bögl et al. | |

FOREIGN PATENT DOCUMENTS

| | | |
|---|---|---|
| DE | 10 133 607 A1 | 8/2002 |
| DE | 102 30 273 | 2/2004 |
| DE | 10 2006 015 838 A1 | 10/2009 |
| DE | 20 2010 000 169 U1 | 5/2010 |
| DE | 10 2012 104 508 A1 | 11/2013 |
| EP | 0 960 986 A2 | 12/1999 |
| JP | 9248745 A | 9/1997 |
| RU | 2046710 C1 | 10/1995 |
| RU | 2344253 C2 | 1/2009 |
| WO | WO 03/069099 | 6/2003 |
| WO | WO 2004/007955 A1 | 1/2004 |
| WO | WO 2010/044380 A1 | 4/2010 |

OTHER PUBLICATIONS

International Search Report and Written Opinion for PCT/EP2011/057088 dated Dec. 22, 2011.
German Search Report and Written Opinion for DE 10 2008 016828 dated Feb. 9, 2011.
International Search Report and Written Opinion for PCT/EP2011/059713 dated Dec. 7, 2011.
Non-final Office Action for U.S. Appl. No. 13/704,265 mailed Jul. 29, 2013, 7 pages.
Final Office Action for U.S. Appl. No. 13/704,265 mailed Mar. 26, 2013, 13 pages.
Russian Office Action for Russian Application No. 2013100498/03 (000653) dated Feb. 25, 2015 with an English machine translation.
An English translation of a Russian Office Action for Russian Application No. 2013100498/03(000653) dated Mar. 11, 2015.

* cited by examiner

TOWER COMPRISING AN ADAPTER PIECE AND METHOD FOR PRODUCING A TOWER COMPRISING AN ADAPTER PIECE

TECHNICAL FIELD

This invention refers to a tower, especially a tower for a wind power plant, comprising a lower tubular section made of concrete and an upper tubular tower section made of steel, as well as an adapter piece for connecting the two tower sections. Furthermore, the invention refers to a method for building a tower.

BACKGROUND

Towers for wind power plants, especially if they are very high, are very often built as so called hybrid towers, in which a lower tower section made of concrete and an upper tower section made of steel are placed on top of the tower section made of concrete.

This hybrid construction method makes it also possible to erect towers with a considerable hub height, which would require a very large wall thickness in the foot if built purely of steel, applying a relatively easy construction method because the diameter of a tubular steel tower is limited owing to transportation reasons. In this context, connecting the tower section made of steel with the tower section made of concrete is important because an optimal bearing load in the concrete must be ensured and damage to the concrete caused by stresses bearing on it must be prevented. Various options have been made known in the state of the art for connecting the steel section with the concrete section.

EP 1 654 460 B1 provides for casting a lower area of the tower section made of steel directly in the tower section made of concrete. To achieve this, the cast terminal area of the tower section made of steel has anchoring elements that protrude radially from the wall of the tower section. Several anchoring elements are provided along the height of the cast terminal area so that the applied loads can be distributed across the entire embedding area.

DE 20 2006 009 554 U1 provides a special adapter element made of steel that is largely ring-shaped and in which, in turn, anchoring elements extending in radial direction are arranged on the inner surface area of the annular steel adapter element. As a result of this, a direct deviation of traction forces without deflection should be allowed in the concrete body.

The disadvantage in connecting the steel tower with the concrete tower lies in the fact that when building the tower section of concrete, the steel tower with its especially developed terminal area or at least the especially developed adapter element must already be available so it can be cast in the tower section made of concrete.

The task of the present invention is to suggest a tower with an adapter element to allow a simple and flexible building of the tower with a good bearing load. Furthermore, a corresponding method should be suggested.

SUMMARY

A tower, especially a tower for a wind power plant, has a lower tubular section made of concrete and an upper tubular tower section made of steel. Furthermore, the tower has an adapter piece for connecting the two tower sections. According to the invention, the adapter piece comprises an annular concrete element and a steel element that has at least one annular flange. In this case, the flange covers an upper surface of the concrete element in an installation position, preferably fully. Consequently, the adapter piece according to the invention consists of concrete and steel, in which case the steel element is cast directly with the concrete element. Here, the annular flange of the steel element is fully grouted with the concrete without air inclusions. In a method for building a tower, a steel element with an annular flange is initially provided for building the adapter piece, which is installed headlong in a ring-shaped formwork. Afterwards, concrete is placed in the formwork and as a result of that, the inner annular concrete element of the adapter piece can be made. Here, the concrete is placed directly on the underside of the flange so that, in the finished adapter element, the flange is fully grouted with concrete and there is a good connection between the concrete element and the steel element.

Since the adapter piece according to the invention contains one concrete element and one steel element, it can be easily built independently from the tower section made of steel and the tower section made of concrete and only afterwards be connected to the two tower sections because the critical connection between steel and concrete is achieved by the direct pouring of the concrete element into the steel element. The annular flange can be fully grouted largely without air inclusions by the headlong pouring of the concrete element in the steel element. As a result of this, a high, dense concrete quality is achieved directly under the flange, so that the highly stressed contact surface between steel and concrete is especially suitable for the load bearing and force resistance of the forces transferred by the steel tower. In this case, the use of concrete grout is not necessary. As a result of this, the adapter piece according to the invention can be used both for towers built with prefabricated parts and for fabrication at the place of installation. Moreover, the flange of the steel element facilitates the erection and assembly of the tower because the latter can serve simultaneously for connection with the upper tower section made of steel and attachment or fixation of tension elements and can additionally fulfill other functions, as described below.

According to an advantageous further innovation of the Invention, the adapter piece has an inner annular concrete element and an outer annular steel element that contains the annular flange in its upper end. The annular steel element located outside makes it possible to greatly improve the sealing between the concrete section and the steel section and protect the upper area of the concrete element, especially from waterlogging. Likewise, reinforcements and anchoring elements cast in the concrete are protected from corrosion. Furthermore, this can increase the load-bearing capacity of the concrete element.

When producing the adapter piece, it is especially advantageous to use the steel element at least partially as formwork for the inner concrete element. The effort needed for producing such formwork can be reduced, thus facilitating the stripping also depending on execution.

The load-bearing capacity of the adapter piece is furthermore improved when the microstructure of the concrete elements has the highest density in the upper end of the concrete element in the installation position because the exertion of force in one place takes place with an especially dense microstructure without air inclusions. This can also be ensured by the fabrication of the adapter element which is performed with the adapter piece being rotated by 180° according to the invention.

Furthermore. It is advantageous is for the adapter piece made of steel and concrete according to the invention to be made independently from the tower sections. If the adapter piece is made as prefabricated part, it is available at the desired point in time and can be connected at any time to one of the two tower sections or to both of them regardless of the production method and production site.

According to an especially advantageous further innovation of the invention, the steel element can have a largely U-shaped cross section encompassing an upper area of the concrete element. Apart from good sealing and protection of the reinforcements, an adapter piece with an especially high load-bearing capacity can be made as a result of this configuration of the steel element. In this case, the concrete element is surrounded by the steel element, so that a three-axial tensioning state can be achieved in the concrete element.

If the concrete element of the adapter piece is made from high-performance concrete, particularly one having a quality of C 50/60 or higher, it is especially suitable for connection to both tower sections and absorbing the force from the tower section made of steel. Especially if used with a steel element that encompasses the concrete element in U-shape, a concrete quality of C 50/60 can already be achieved for utilization.

It is furthermore advantageous for the flange of the adapter piece to preferably have many bore holes distributed over its external circumference so the fastening elements for fixing the tower section made of steel in place can be inserted through them. It is furthermore advantageous for the flange to preferably have many bore holes distributed over its inner circumference so the pre-stressing tendons for bracing the tower section made of concrete can be inserted through them and also fastened on the upper side of the flange. Thus, the flange of the steel element serves not only for protecting the concrete element with its reinforcements and the force exertion coming from the steel tower but also for fixing the pre-stressing tendons and the steel tower in place.

Jacket tubes are preferably cast in the concrete element so the pre-stressing tendons can be led through them and fixed in place on the steel element flange. The adapter piece can thus serve for connecting the two tower sections and simultaneously for placing an initial stress on the tower section made of concrete and anchoring the pre-stressing tendons. It is also advantageous to fasten the tower section made of steel independently from the anchoring the pre-stressing tendons, so that the assembly or disassembly of individual elements is made possible independent from one another.

It is also advantageous to embed numerous anchoring bolts in the concrete element of the adapter piece in a perpendicular position so the tower section made of steel can be fixed in place with them. The exertion of force coming from the steel tower to the adapter element can take place advantageously as a result of this arrangement. In addition, this arrangement allows the tower section made of steel to be easily mounted. In this case, the tower section made of steel can be fastened directly on the embedded anchoring bolts or be connected to them with other fastening elements.

It is furthermore advantageous if the anchoring bolts extend through and beyond the steel element flange across the upper side of the flange. For mounting the tower section made of steel, it must be merely placed on the flange with its corresponding bore holes and can be fixed in place with nuts, for example. By fixing the tower section made of steel in place with the anchoring bolts, an initial stress can be simultaneously and advantageously placed on the concrete element of the adapter piece to further improve the latter's load-bearing capacity. To allow subsequent bracing, the anchoring bolts have a separating layer or are set in concrete in a jacket tube.

According to an advantageous further innovation of the invention, the pre-stressing tendons can be fixed in place without anchoring bolts directly on the steel element flange. The good connection of the steel flange to the concrete element allows the steel flange to directly take over the load distribution function, so that no additional elements are needed. This arrangement facilitates assembly even more.

An advantageous execution of the invention provides that at least one lower surface of the adapter piece is smoothed or milled over after the concrete has hardened, preferably parallel to the upper surface of the flange when in the installation position. The parallelism of the lower contact surface of the adapter piece with regard to the upper flange surface can be easily ensured as a result of this. A refinishing of the upper flange surface of the steel flange before or after casting can also be provided to achieve the highest possible parallel position and even surface.

Regardless of, or also in combination with, the adapter piece described above, it is advantageous for a tower having a lower tubular tower section made of concrete and an upper tubular section made of steel to have its lower tower section be made of annular or annular segment-shaped prefabricated concrete parts. This especially facilitates the flexible building of the tower, as the prefabricated concrete parts can be fully manufactured in advance and put together upon arrival at the assembly site.

Preferably, the prefabricated concrete parts are braced dry against one another to facilitate the assembly of the tower section made of concrete even further. The high quality execution of the contact surfaces makes a sealing of the joints unnecessary.

To seal a horizontal contact joint between the prefabricated concrete parts, however, a sealing profile can also be provided. To achieve this, the prefabricated concrete parts can have a groove for the sealing profile. Additionally, the sealing can be done with epoxy resin.

It is further advantageous to brace the prefabricated concrete parts by means of external pre-stressing tendons running inside the tower. In this case, at least two pre-stressing tendons extend between one foot section of the tower and the upper adapter piece. Additional pre-stressing tendons can either be braced between the foot of the tower and the upper adapter piece or only up to partial heights of the tower. For example, every second tensioning element can extend all the way to the adapter piece while the other half of the pre-stressing tendons is anchored at one-half of the height or another partial height.

In order to also allow the horizontal contact surfaces of the prefabricated concrete parts to be parallel in the tower section made of concrete and therefore facilitate simple on-site assembly, at least one of the two horizontal contact surfaces is processed in a way to remove material, for example by regrinding it or milling it over. During onsite assembly, the individual prefabricated concrete parts must therefore be placed only on top of one another without needing additional adjusting or leveling work. To process the horizontal contact surfaces, it is especially advantageous if both horizontal surfaces are processed in a damping fixture. In this case, the annular, or annular segment-shaped, prefabricated concrete parts are rotated around their own axis during processing. If need be, a leveling layer (such as an epoxy resin) can be applied on the contact surfaces to smoothen out uneven patches.

If the annular prefabricated concrete parts comprise two or more annular segments, then it is furthermore advantageous if vertical contact joints are also executed dry between the contact surfaces of the annular segment-shaped prefabricated concrete parts. Here, the ring segments are braced in horizontal direction, preferably with diagonally arranged pre-stressing tendons with screws, for example. However, the joint can be also be made without screw connections, in which case the vertical joint is held together only by the vertical tension of the tower section made of concrete. On successive rings, the ring segments of a ring are in each case arranged in a twisted position with respect to one another.

According to another advantageous further innovation of the invention, the prefabricated concrete parts have at least one recess on their contact surfaces, preferably at least one bore hole, so one element can be inserted in it in each case for securing the position or twisted position. This element can be a plastic dowel. Preferably, several bore holes are distributed evenly across the perimeter in this case.

BRIEF DESCRIPTION OF THE DRAWINGS

Further advantages of the invention are described with the help of the embodiments shown below, in which.

DETAILED DESCRIPTION

Figure 1:
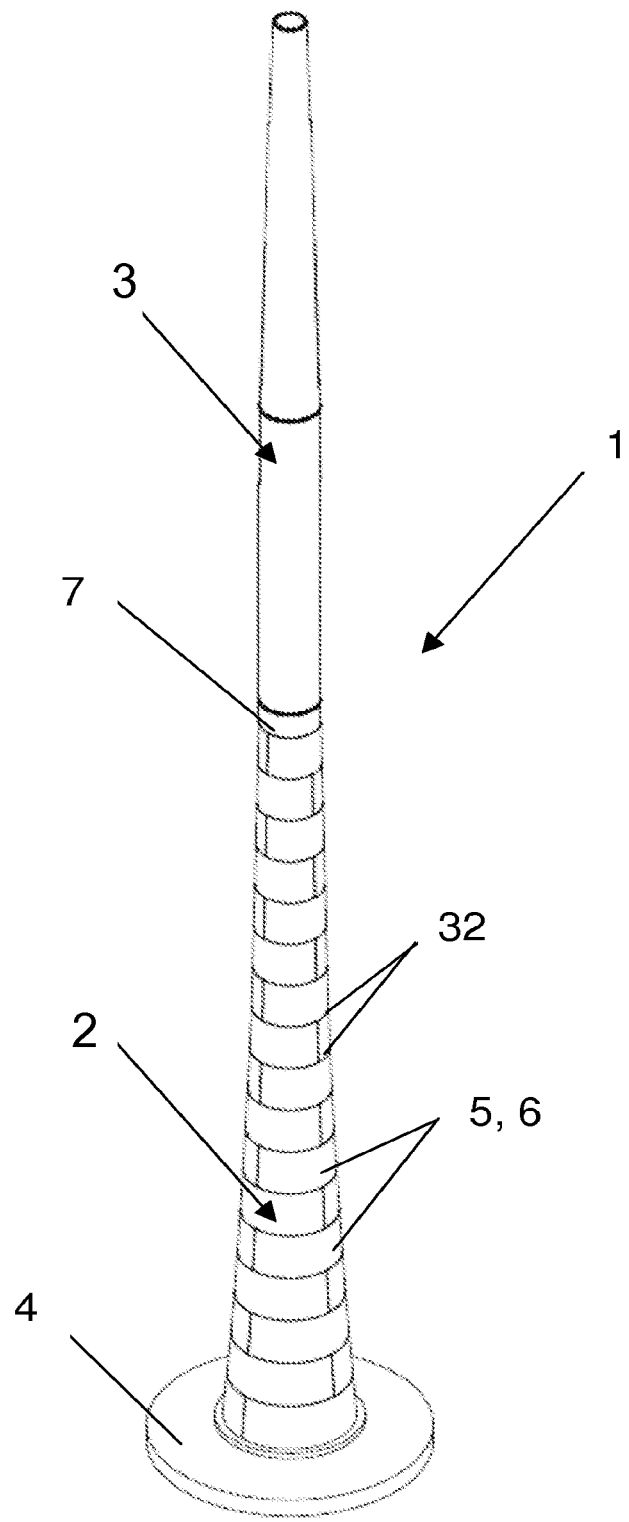
FIG. 1 illustrates an overview or the tower according to the invention with a concrete section, a steel section and an adapter piece.

FIG. 1 shows a perspective view of a tower 1, for a wind power plant, for example. The tower 1 has been executed as a hybrid tower, for which a lower tubular tower section 2 made of concrete and an upper tubular tower section 3 made of steel have been provided. Furthermore, the tower 1 has a foot section 4 or a foundation. On the tower section made of steel 3, a nacelle and rotor are arranged in a known way, but are not shown here.

Figure 4:
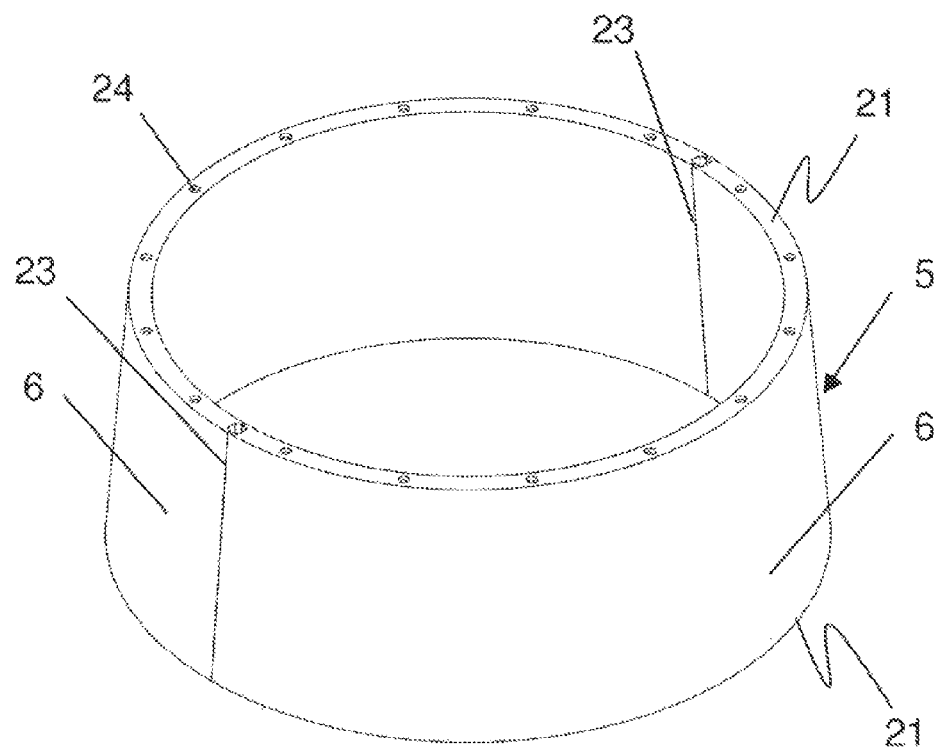
FIG. 4 illustrates a view of an annular prefabricated concrete part for a tower according to the invention.

Here, the concrete tower section 2 is made of individual, annular pre-fabricated concrete parts 5, which comprise, in each case, two ring segments 6, as can be seen in FIG. 4. As a result of this, huge towers with very large diameters in their foot areas can be favorably built using the prefabricated construction method because the individual prefabricated parts can be easily transported. The steel tower section 3 can be prefabricated as one single part and brought to the assembly site or be made of several parts that can be put together at the assembly site or that can be out together earlier in a production site. To easily and flexibly connect the concrete tower section 2 and the steel tower section 3, an adapter piece 7 is provided.

Figure 2:
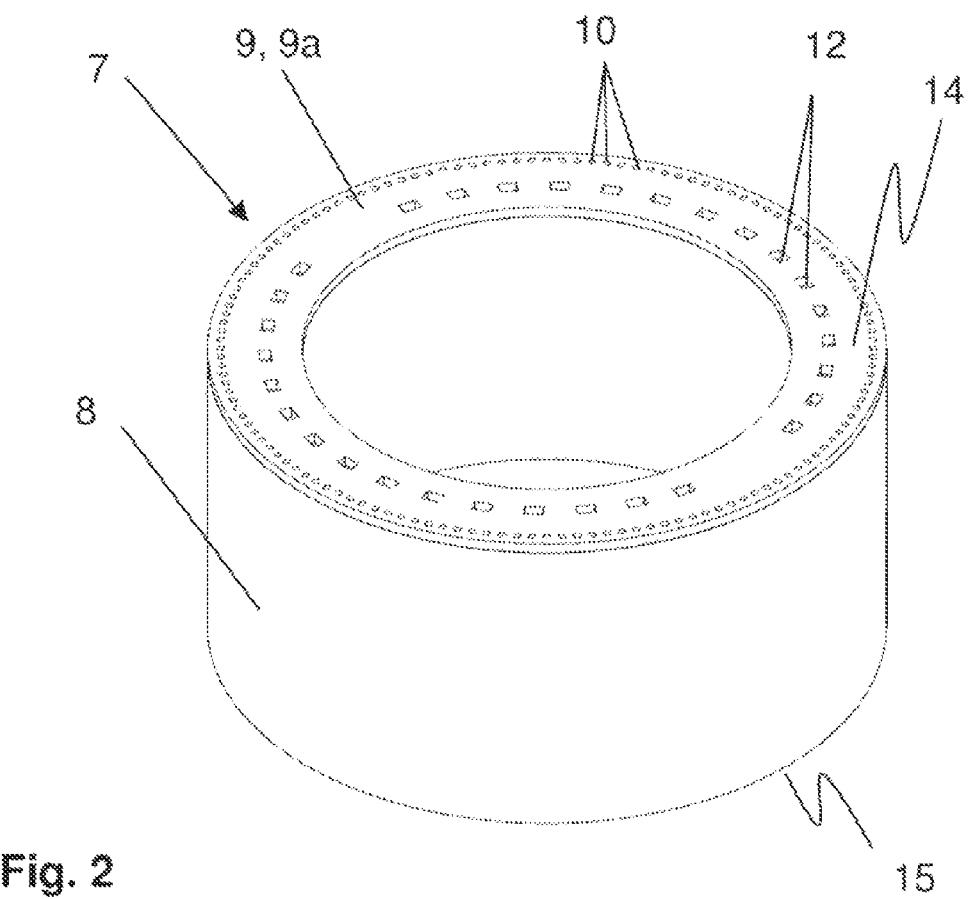
FIG. 2 illustrates a perspective view of an adapter piece according to the invention.

The adapter piece 7 according to the invention (FIG. 2) comprises an annular concrete element 8 and a steel element 9, executed here in the shape of an annular flange 9a.

As can be seen here, the flange 9a fully covers the upper surface of the concrete element 8 in an installed position to protect it well against the penetration of humidity. Thus, flange 9a serves as a seal between the tower section 2 made of concrete and the tower section 3 made of steel. The steel element 9 has in this case numerous bore holes 10 distributed on its external perimeter for insertion by bolts 11 (see FIG. 3) to fasten the tower section 3 on it. Furthermore, the steel element 9 has openings 12 on the internal perimeter of the flange 9a through which pre-stressing tendons 13 (see FIG. 3) can be inserted and fastened to the flange 9a while the tower is assembled.

The adapter piece 7 according to the invention is made by placing the steel element 9 headlong (i.e. with the subsequent upper side 14 downwards) into an annular formwork (not shown here). Afterwards, the concrete is directly applied on the subsequent underside of the flange 9a. By manufacturing the adapter piece 7 rotated by 180° for later installation position, the concrete element 8 can be made with particularly high quality in the upper head area of the concrete element 8 that will subsequently rest above it. Thus, the concrete element 8 has in its head area a very dense concrete microstructure with few air inclusions. By directly covering the subsequent lower side of flange 9a with concrete, it can be fully grouted, thus making the highly stressed contact surface of high quality and largely without air inclusions. In this case, it is advantageous for steel element 9 to be directly a part of the formwork (not shown); here, the flange 9a forms an underside of the formwork.

After removing the formwork, the adapter piece 7 can remain stored headlong until final solidification of the concrete so that the highly stressed head area of the adapter piece can be high quality. After formwork removal and adapter piece 7 solidification, the lower surface 15 of the adapter piece 7 and, if necessary, the upper side 14 of the flange 9a, are processed for removing material in order to ensure parallelism. As a result of this, no more adjustment work is necessary during subsequent assembly.

Owing to the design according to the invention, the adapter piece 7 can be manufactured favorably as a prefabricated part with a concrete element 8 and a steel element 9, thus allowing its full production independently from the manufacturing of the concrete tower section 2 and steel tower section 3. By means of the adapter piece 7 according to the invention, it is therefore possible to erect a tower 1 completely or partially with the prefabricated construction method at the assembly site. Here, it is particularly advantageous that the manufacturing of the tower sections 2 and 3 and of the adapter piece 7 can take place at different times. This increases the flexibility of the adapter piece 7 and the assembly options. Hence, the adapter piece 7 is also suitable for off-shore installations. So the adapter piece design can allow road transportation, its maximum height of 3.80 meters (m) and exterior diameter of 3 to 8 m is advantageous. If road transportation is not necessary, the adapter piece 7 can be manufactured with any dimensions.

Figure 3:
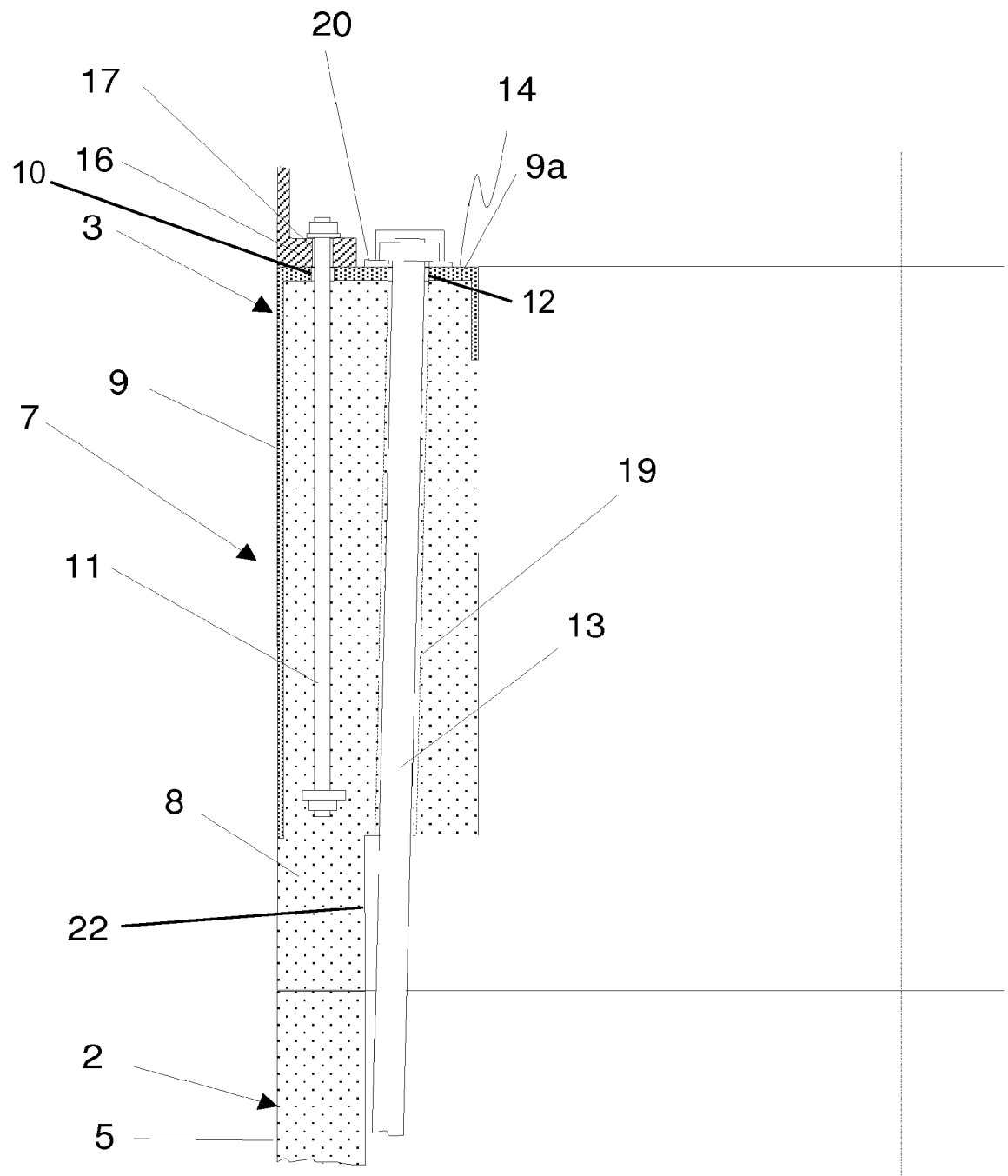
FIG. 3 illustrates a cross section of an adapter piece according to the invention.

FIG. 3 shows a section drawing of another design of an adapter piece 7 according to the invention. Contrary to the drawing of FIG. 2, the adapter piece 7 contains an inner annular concrete element 8 and an outer annular steel element 9 that in the upper end of its installation position has an annular flange 9a pointing inwards. It is particularly advantageous for the steel element 9 to be largely executed in a U-shape in a cross section (as shown here) so that it encompasses the upper area of the concrete element 8. As a result of this, an especially good connection between the concrete element 8 and the steel element 9 as well as particularly good load-bearing capacity of the concrete element 8 can be ensured.

As can also be seen in FIG. 3, numerous perpendicularly oriented anchoring bolts 11 are embedded here in the concrete element 8 of the adapter piece 7. In this case, the anchoring bolts 11 are guided by the corresponding bore holes 10 of the flange 9a and protrude above the upper side 14 of the adapter piece. When subsequently assembling the tower 1, the tower section 3 made of steel, which has a fastening flange 16 with numerous fastening bore holes 17 distributed over the circumference in its foot area, can be guided through the anchoring bolts and then fastened. The anchoring bolts 11 can be provided with a separating agent so they are not directly connected to the concrete element 8 and can be disassembled again. This makes it possible to disassemble the tower 1 or exchange the anchoring bolts 11 later during maintenance. Likewise, the anchoring bolts 11 can also be cast in a jacket tube to allow disassembly and exchange.

As can also be seen in FIG. 3, the flange 9a of the adapter piece 7 has numerous openings 12 for fixing the pre-stressing tendons 13 in place. In addition, jacket tubes 19 are cast in the concrete element 8 of the adapter piece 7 to facilitate a subsequent advantageous bracing of the pre-fabricated concrete parts 5. To accomplish this, the pre-stressing tendons 13 are guided through the jacket tubes 19 in the concrete element 8 and the openings 12 in the flange 9a and fixed in place on the upper side 14 of the flange 9a. Here, the pre-stressing tendons 13 have been fastened directly on the flange 9a without an anchoring plate. As shown here, a wedge plate 20 is merely placed underneath if the pre-stressing tendons 13 run obliquely. With this embodiment of the flange 9a according to the invention (which is very well connected with the concrete element 8), it can at the same time take over the function of a load-distributing plate.

In the installed position, the adapter element 7 has a recess 22 on the lower end so that the pre-stressing tendons are merely guided within the wall of tower 1 in the area of the adapter piece 7 and otherwise extend along the interior of the tower outside the wall down to the foot section 4 of the tower 1, where they are also anchored. However, to guide the pre-stressing tendons 13, they could also be fastened or at least guided at certain distances along the height of the tower by means of suitable fastening or guidance elements. Instead of the initial stress accomplished with external pre-stressing tendons 13 shown here, initial stress can naturally also be exerted on the tower section made of concrete 2 with pre-stressing tendons 13 placed in the concrete cross-section.

The prefabricated concrete parts 5 of the tower section 2 made of concrete are placed dry on top of one another during the assembly of the tower section 2 and braced against one another. The prefabricated concrete pats 5 (see FIG. 4), which can each comprise two ring segments 6, have one upper and one lower horizontal contact surface 21. At least one of the contact surfaces 21 of the prefabricated concrete parts 5 is processed to remove the material (i.e. smoothed). As a result of this, it is possible to create an even contact surface 21 that allows the easy build-up of the tower section 2 without time-consuming adjustment work. Furthermore, by polishing the contact surfaces 21, a smooth and even contact surface 21 is achieved, so that the prefabricated concrete pieces 5 can be braced. This simplifies assembly and allows a disassembly to take place at any time.

If the annular prefabricated concrete parts 5 comprise two or more ring segments 6 (as is shown here), then vertical contact joints 23 are provided in every ring 5 of the tower 1. These vertical contact joints 23 are also preferably executed dry as well. So the individual ring segments 6 can be fixed against one another, diagonally arranged threaded joints (not shown) can be provided in the area of the vertical contact joints 23. However, a fixation of the ring segments 6 with respect to each other can also be accomplished solely through the preload force of the pre-stressing tendons 13 and offsetting the individual ring segments 6 in every ring 5. Here, the vertical contact joints 23 of the following ring 5 are offset by 90° in each case (see FIG. 1).

As additionally shown in FIG. 4, the prefabricated concrete parts 5, 6 can have one or more recesses 24, which in this case are bore holes, on their contact surfaces 21. A plastic dowel, for example, can be placed in them (not shown) for engaging in the prefabricated concrete part 5, 6 lying on top in order to prevent the prefabricated concrete parts 5, 6 from being twisted or horizontally displaced. Instead of a plastic dowel, another element from the most varied materials can be used for securing the position and preventing twisting. An especially good fixation of the individual prefabricated concrete parts 5, 6 with respect to one another can be achieved if, as shown here, several dowels and/or recesses 24 are arranged so they are distributed over the circumference of the prefabricated concrete part 5, 6.

Figure 5:
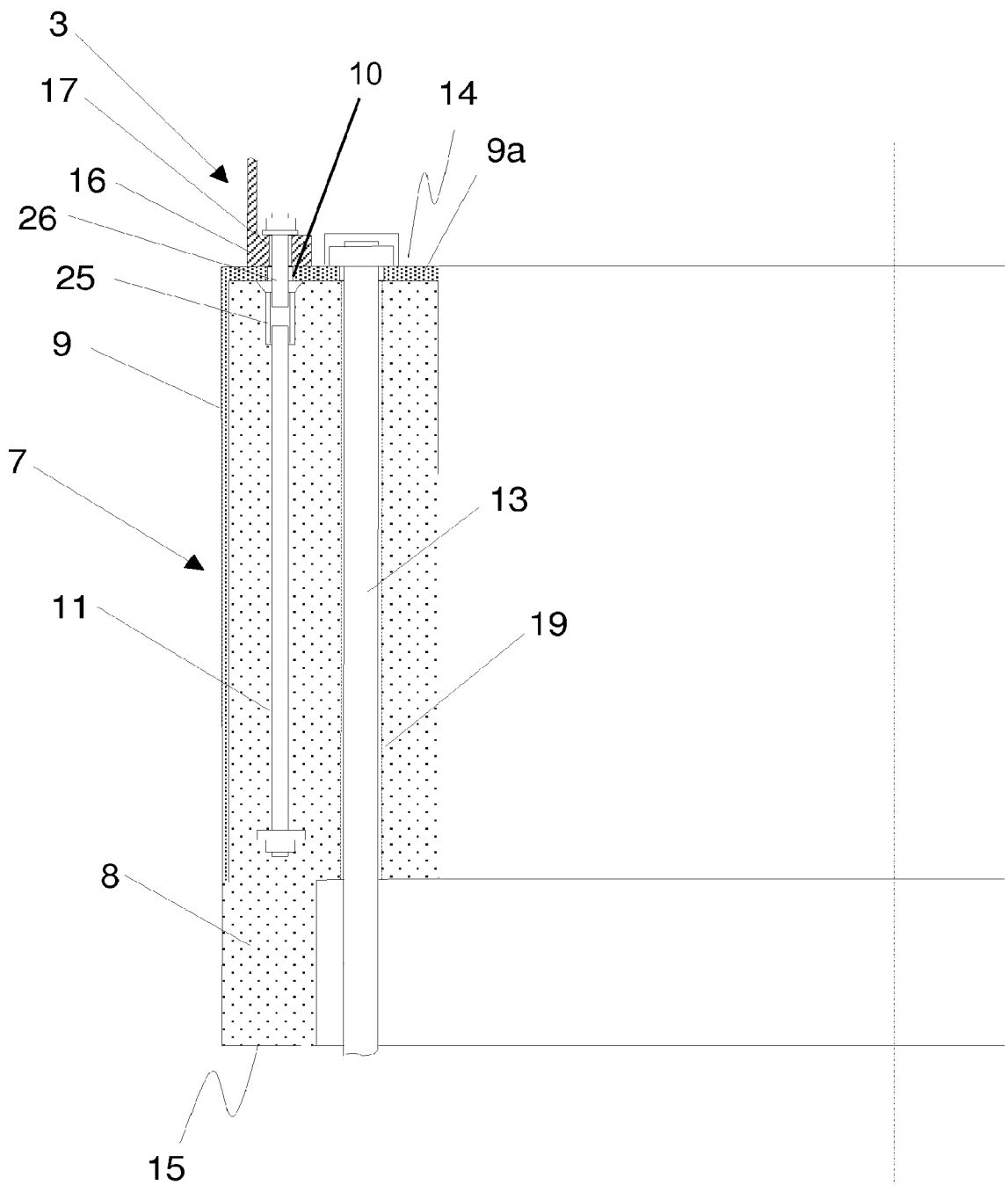
FIG. 5 illustrates a cross section of an adapter piece according to the Invention with an alternate fastening of the tower section made of steel.

The schematic cross-section diagram of FIG. 5 shows an alternative embodiment of an adapter piece 7 for connecting a concrete tower section 2 with a steel tower section 3. Contrary to the drawing of FIG. 3, the anchoring bolts 11 set in the concrete element 8 of the adapter piece 7 do not extend beyond the upper side 14 of the adapter piece, but just below the upper side 14. In addition, a threaded socket 25 has been cast on the upper side 14 of the adapter piece 7 or of the concrete element 8 that is screwed onto the cast anchoring bolt 11. Here, the threaded socket 25 is also shown in section. The flange 9a of the steel element 9 also has a corresponding number of bore holes 10 through which additional fastening elements 26 for fastening the tower section 3 made of steel can be inserted. Here, the tower section 3 made of steel is fastened with several threaded bolts, which can be inserted through the fastening flange 16 of the tower section 3 made of steel and the flange 9a for subsequent screwing onto the cast socket 25. As a result of this, the adapter piece 7 can be made and transported in an especially favorable way because no protruding parts exist. Even in this embodiment, a disassembly of the tower section 2 made of steel is easily possible. So the cast anchoring bolts 11 can be exchanged, they can also be provided with a separating agent or be cast in a jacket tube. Furthermore, the anchoring bolts 11 can, at the same time, be advantageously used for exerting a preload on the adapter piece 7. A lower anchoring plate and, if need be, a fastening nut are in this case securely embedded in the concrete element 8.

Additionally, in FIG. 5, the fastening flange 16 of the tower section 3 made of steel can be somewhat smaller than the adapter piece 7, so that it can be arranged offset towards the inside on the adapter piece 7. This arrangement makes it possible to achieve a favorable load of the concrete element 8 and an improved absorption of compression stress forces.

The invention is not limited to the embodiments shown. Modifications and combinations also fall within the scope of the invention.

The invention claimed is:

1. A tower for supporting a nacelle and a rotor of a wind power plant, the tower comprising:
   a foot section;
   a lower tubular tower section made of concrete and disposed on the foot section;
   an upper tubular tower section made of steel configured to support the nacelle and the rotor of the wind power plant; and
   a prefabricated adapter piece for connecting the lower tubular tower section and the upper tubular tower section, the adapter piece comprising an annular concrete element that defines an aperture therethrough and includes an upper surface and a steel element including at least one annular flange that covers the upper surface of the concrete element when in an installation position, and the steel element being directly cast with the concrete element so that the annular flange is grouted with concrete that forms at least a portion of the concrete element and the concrete element directly abuts the steel element to form the adapter piece before using the adapter piece to connect the lower tubular tower section and the upper tubular tower section;

the annular concrete element of the adapter piece comprises an inner annular concrete element and the steel element of the adapter piece comprises an outer annular steel element that has an inverted U-shaped cross-section and encompasses and protects an upper area of the concrete element with the annular flange extending inwardly in an upper end of the outer annular steel element when the outer annular steel element is in the installation position.

2. The tower according to claim 1, wherein a microstructure of the concrete element of the adapter piece has a highest density of the concrete element on an upper end of the concrete element in the installation position.

3. The tower according to claim 1, wherein the annular flange of the steel element has a plurality of bore holes through which fastening elements are insertable for affixing the steel upper tubular tower section in place.

4. The tower according to claim 3, wherein the fastening elements comprise a plurality of anchoring bolts oriented vertically in an installed position, the anchoring bolts being cast in the concrete element of the adapter piece on which the steel upper tubular tower section is affixable.

5. The tower according to claim 4, wherein the anchoring bolts protrude through the annular flange of the steel element and extend over an upper side of the annular flange.

6. The tower according to claim 1, wherein the annular flange of the steel element has a plurality of openings through which pre-stressing tendons for bracing the concrete lower tubular tower section are insertable, the pre-stressing tendons being fastenable on an upper side of the flange of the steel element.

7. The tower according to claim 6, wherein the pre-stressing tendons are fastenable directly onto the annular flange of the steel element without anchoring plates.

8. The tower according to claim 1, wherein at least one lower surface of the adapter piece when in the installation position is at least one of smoothed or milled.

9. The tower according to claim 1, wherein the concrete element of the adapter piece is made of a high-performance concrete having a quality of C50/60 or higher.

\* \* \* \* \*